US011012525B2

(12) United States Patent
Freed et al.

(10) Patent No.: US 11,012,525 B2
(45) Date of Patent: May 18, 2021

(54) IN-FLIGHT BUILDING AND MAINTAINING DICTIONARIES FOR EFFICIENT COMPRESSION FOR IOT DATA

(71) Applicant: Cisco Technology, Inc., San Jose, CA (US)

(72) Inventors: Michael Freed, Pleasanton, CA (US);
Boris Degtyar, Cupertino, CA (US);
Krishna Chikkaveeraiah Chalamasandra, Fremont, CA (US);
Bhuvanalakshmi Kadapakkam Nandabalan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 9 days.

(21) Appl. No.: 16/224,890

(22) Filed: Dec. 19, 2018

(65) Prior Publication Data
US 2020/0204638 A1      Jun. 25, 2020

(51) Int. Cl.
*H04L 29/08* (2006.01)
(52) U.S. Cl.
CPC .......... *H04L 67/2828* (2013.01); *H04L 67/10* (2013.01); *H04L 67/12* (2013.01)
(58) Field of Classification Search
CPC ..... H04L 67/2828; H04L 67/10; H04L 67/12; H04L 67/06; H04L 63/029; H04L 67/02;
(Continued)

(56) References Cited

U.S. PATENT DOCUMENTS 6,883,035 B2    4/2005  Hannu et al.
7,930,436 B1 *  4/2011  Znosko ................... H04L 69/04
                                                      709/247
(Continued)

FOREIGN PATENT DOCUMENTS

JP       2018006964 A  *  1/2018

OTHER PUBLICATIONS

Japanese patent application: JP2018006964A English translation from Japanese patent office website (Year: 2017).*
(Continued)

*Primary Examiner* — Ninos Donabed
(74) *Attorney, Agent, or Firm* — Behmke Innovation Group LLC; Kenneth J. Heywood; Jonathon P. Western

(57) ABSTRACT

In one embodiment, a sender device in a network sends a plurality of uncompressed messages to a receiver device in the network. The sender device generates a sender-side compression dictionary based on the plurality of uncompressed messages. The receiver device also generates a receiver-side compression dictionary based on the uncompressed message. The sender device obtains an approval of the sender-side compression dictionary from the receiver device by sending a checksum of the sender-side compression dictionary to the receiver device, whereby the receiver device generates the approval by comparing the checksum of the sender-side compression dictionary to a checksum of the receiver-side compression dictionary. The sender device sends a compressed message to the receiver device that is compressed using the sender-side compression dictionary, after obtaining the approval of the sender-side compression dictionary from the receiver device.

15 Claims, 8 Drawing Sheets

(58) Field of Classification Search
CPC ..... H04L 67/2838; H04L 67/32; H04L 69/22; H04L 12/1863; H04L 67/42; H03M 7/3084; H03M 7/30; H03M 7/6094; H04N 19/103; H04N 19/164; H04N 19/176

See application file for complete search history.

(56) References Cited

U.S. PATENT DOCUMENTS

| | | | |
|---|---|---|---|
| 7,975,071 B2 | 7/2011 | Ramjee et al. | |
| 8,665,124 B2 | 3/2014 | Pardo et al. | |
| 8,855,301 B2 | 10/2014 | McGrew | |
| 2008/0034268 A1* | 2/2008 | Dodd | H03M 7/30 714/755 |
| 2008/0215849 A1* | 9/2008 | Scott | G06F 16/9014 711/216 |
| 2008/0301256 A1* | 12/2008 | McWilliams | G06F 12/0806 709/214 |
| 2009/0019345 A1* | 1/2009 | Kaufman | H03M 13/096 714/807 |
| 2009/0187673 A1* | 7/2009 | Ramjee | H04L 67/2876 709/247 |
| 2011/0285732 A1* | 11/2011 | Carter | G06F 16/1744 345/555 |
| 2012/0310890 A1* | 12/2012 | Dodd | G06F 16/113 707/646 |
| 2013/0185387 A1* | 7/2013 | Gero | H04L 29/08792 709/217 |
| 2013/0311433 A1* | 11/2013 | Gero | H03M 7/3091 707/692 |
| 2013/0346483 A1* | 12/2013 | Alstad | H04L 69/04 709/203 |
| 2015/0178305 A1* | 6/2015 | Mueller | G06F 16/221 707/693 |
| 2016/0037509 A1* | 2/2016 | Tiger | H04L 69/02 370/329 |
| 2016/0110408 A1* | 4/2016 | Madhavarapu | G06F 16/2358 707/615 |

OTHER PUBLICATIONS

Keramidas, et al., "Dynamic Dictionary-Based Data Compression for Level-1 Caches", ARCS 2006: Architecture of Computing Systems—ARCS 2006—International Conference on Architecture of Computing Systems, pp. 114-129, 2006, Springer, Berlin, Heidelberg.

Delta encoding—Wikipedia; https://en.wikipedia.org/wiki/Delta_encoding; pp. 1-5.

Zstandard—Wikipedia; https://en.wikipedia.org/wiki/Zstandard; pp. 1-3.

Zip (file format)—Wikipedia; https://en.wikipedia.org/wiki/Zip_(file_format); pp. 1-10.

Lempel-Ziv-Welch—Wikipedia; https://en.wikipedia.org/wiki/Lempel-Ziv-Welch; pp. 1-10.

* cited by examiner

IN-FLIGHT BUILDING AND MAINTAINING DICTIONARIES FOR EFFICIENT COMPRESSION FOR IOT DATA

TECHNICAL FIELD

The present disclosure relates generally to computer networks, and, more particularly, to in-flight building and maintaining dictionaries for efficient compression for Internet of Things (IoT) data.

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room, when a person enters the room.

With the increased proliferation of networked devices in the IoT, the amount of data flowing between IoT devices, as well as to and from the cloud, is also rapidly increasing. For example, a networked thermostat in a home may send data regarding the current temperature in the home to the cloud, to allow the homeowner to monitor the temperature in the home, remotely. In another example, a sensor in an industrial setting may provide sensor data to a controller. In turn, the controller may send control signals to an actuator, thus affecting the sensor readings of the sensor and forming a control loop.

Unfortunately, the vast number of IoT devices and their associated communications can overwhelm some networking infrastructure, making data compression an attractive option for sending IoT data over a network. However, the nature of IoT data also necessitates the development of new compression approaches.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
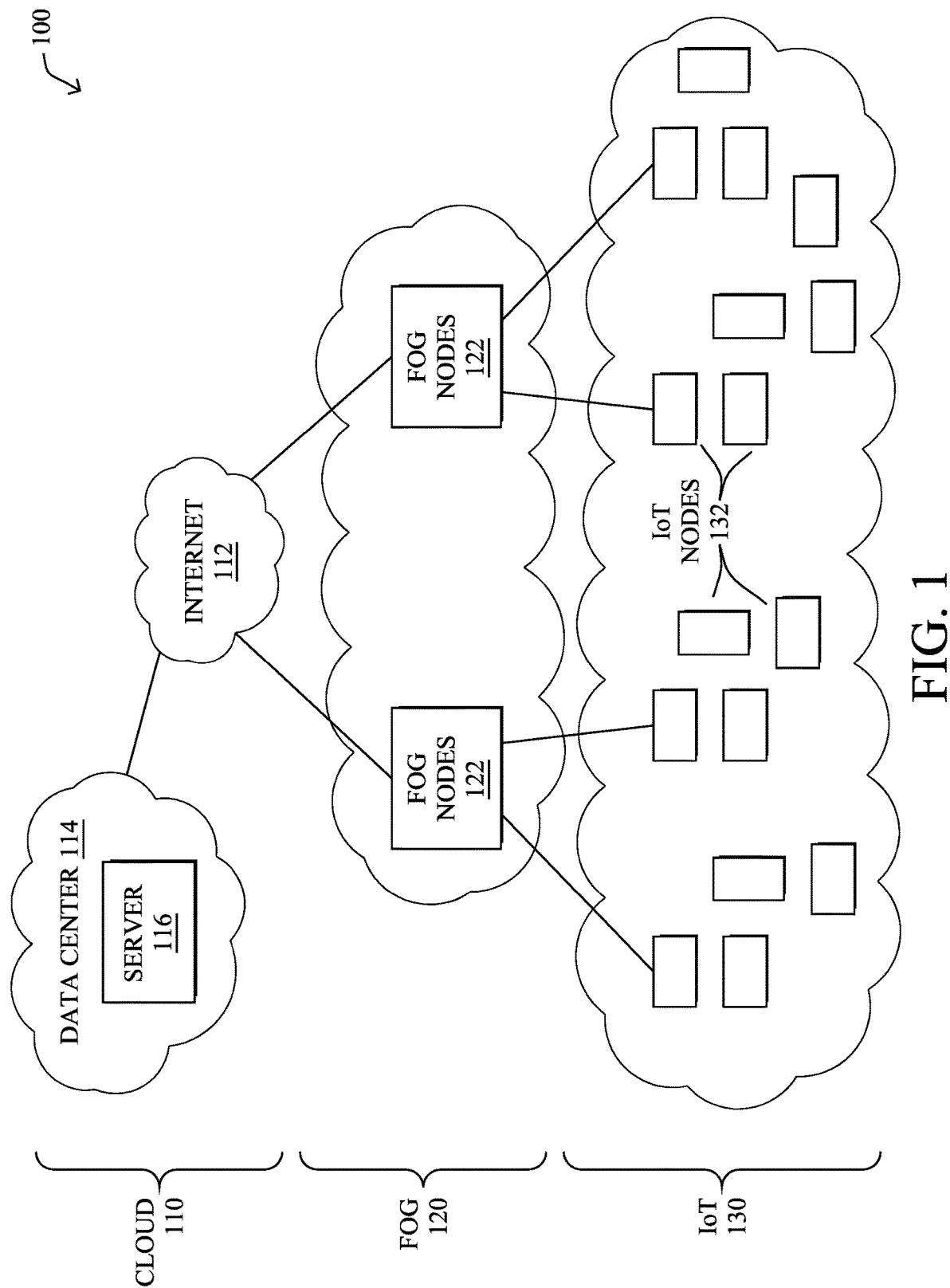
FIG. 1 illustrates an example computer network.

According to one or more embodiments of the disclosure, a sender device in a network sends a plurality of uncompressed messages to a receiver device in the network. The sender device generates a sender-side compression dictionary based on the plurality of uncompressed messages. The receiver device also generates a receiver-side compression dictionary based on the uncompressed message. The sender device obtains an approval of the sender-side compression dictionary from the receiver device by sending a checksum of the sender-side compression dictionary to the receiver device, whereby the receiver device generates the approval by comparing the checksum of the sender-side compression dictionary to a checksum of the receiver-side compression dictionary. The sender device sends a compressed message to the receiver device that is compressed using the sender-side compression dictionary, after obtaining the approval of the sender-side compression dictionary from the receiver device.

In further embodiments, a receiver device in a network receives a plurality of uncompressed messages sent by a sender device in the network. The sender device generates a sender-side compression dictionary based on the uncompressed message and the receiver device also generates a receiver-side compression dictionary based on the plurality of uncompressed messages. The receiver device sends an approval of the sender-side compression dictionary to the sender device, based on a comparison of a checksum of the receiver-side compression dictionary to a checksum of the sender-side compression dictionary received from the sender device. The receiver device decompresses a compressed message sent to the receiver device that is compressed using the sender-side compression dictionary, after sending the approval of the sender-side compression dictionary to the sender device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, a fog node 122 may operate as a root node for IoT nodes 132 in a local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
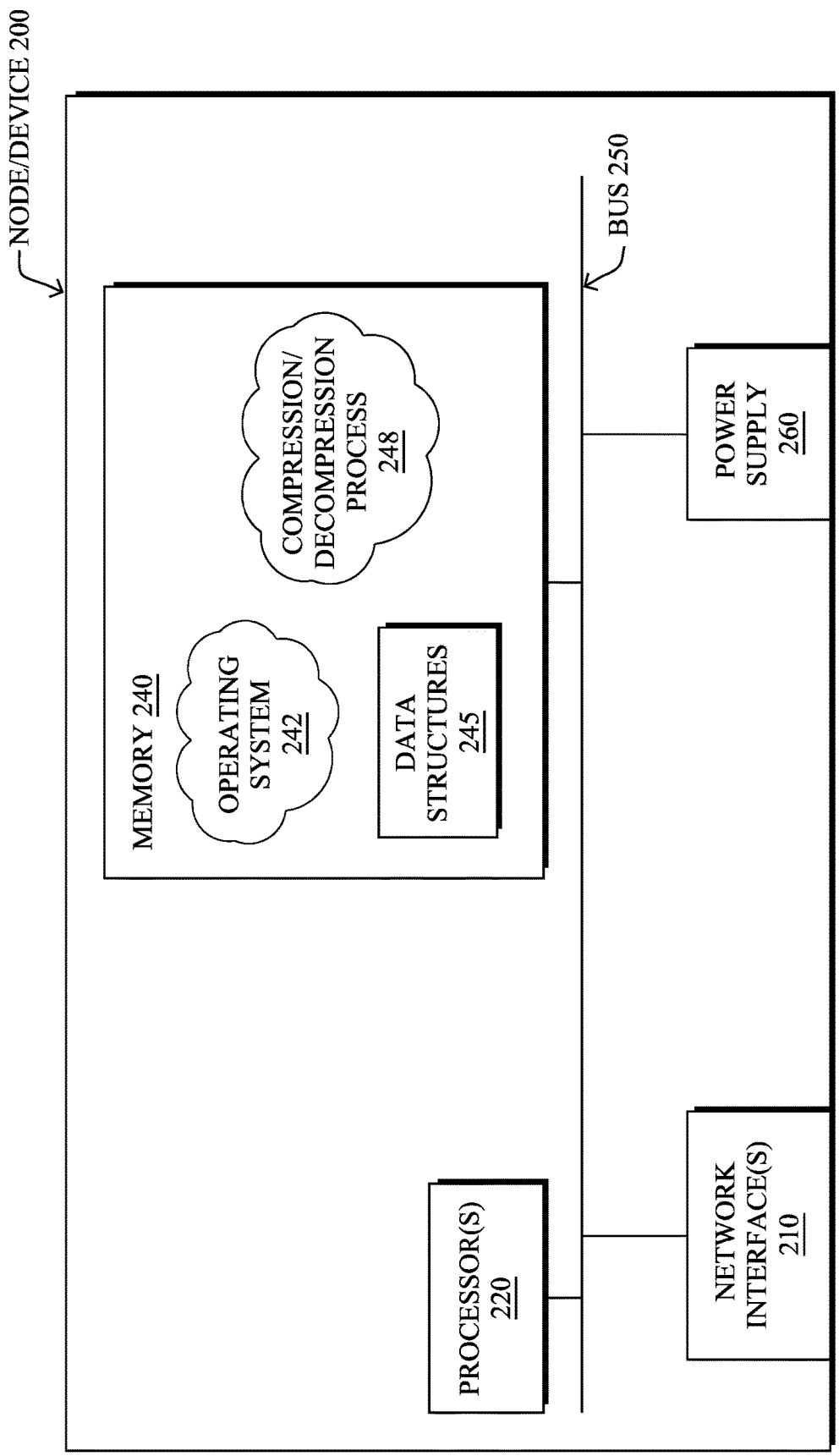
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative compression/decompression process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
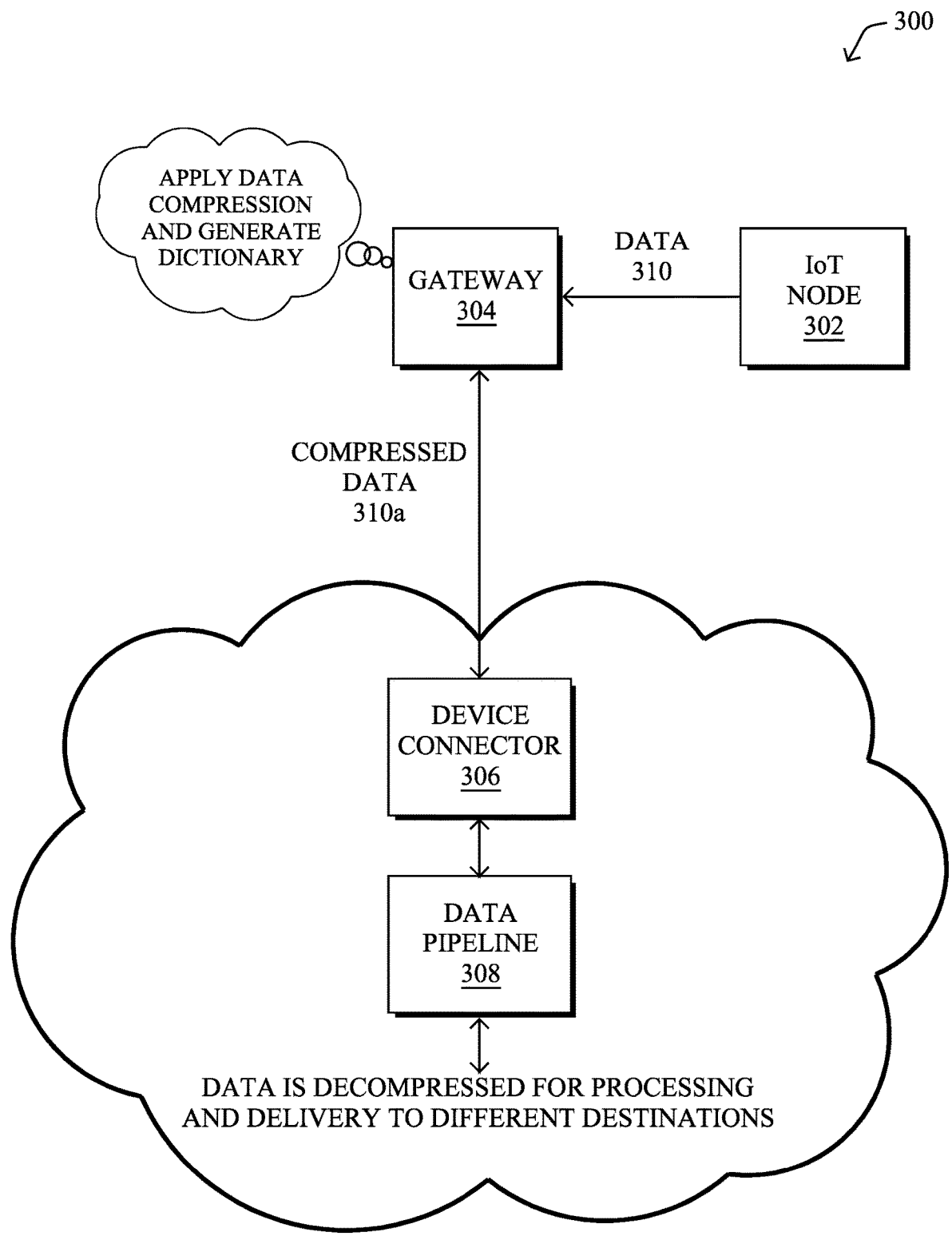
FIG. 3 illustrates an example of the compression and decompression of data from an Internet of Things (IoT) node.

As noted above, there may be a large number of IoT nodes/devices in a typical IoT deployment, leading to opportunities to leverage data compression and decompression. One such example is shown in FIG. 3, which illustrates an example 300 of the compression and decompression of data from an IoT node 302.

For illustrative purposes, assume that IoT node 302 is to send data 310 (e.g., a device health update, a sensor reading, etc.) to a remote location, such as a cloud-based service or other endpoint device via the Internet. To do so, IoT node 302 may send data 310 to gateway 304, which may be, for example, an 809 or 829 Industrial Integrated Services Router by Cisco Systems, Inc.

In many cases, gateway 304 may provide connectivity between the local IoT network of node 302 and the Internet via a cellular or other wireless connection. For example, assume that gateway 304 leverages a cellular wireless connection, to send data 310 from IoT node 302 to a cloud-based service that includes a device connector 306 and a data pipeline 308 that delivers data 310 to any number of recipient destinations. Such cellular connectivity typically requires expensive data plans and offers limited data size, thus demanding effective and efficient data compression techniques, to preserve bandwidth and potentially reduce costs. Indeed, many IoT deployments now include thousands of IoT nodes/devices that generate a significant amount of traffic in the aggregate.

To reduce the amount of data 310 sent from gateway 304 to device connector 306 and data pipeline 308, gateway 304 may utilize compression, to compress data 310 into compressed data 310*a*. In turn, device connector 306, data pipeline 308 and/or the endpoint recipient(s) of compressed data 310*a* may decompress compressed data 310*a* back into the original data 310 for consumption.

While there are many existing data compression approaches that gateway 304 could employ, existing compression approaches also fail to take into account the following observations regarding IoT data traffic:

Typically, individual messages in this context are short (e.g., 100-1500 bytes). Popular compression algorithms, such as Lempel-Ziv-Welch, are not efficient on such messages, due to their relatively small sizes. Likewise, Zip and similar archive formats remain the best compression approaches for moderately sized data and are not suitable for small sized IoT data communications.

The message format in many IoT deployments is JSON, XML, string, or binary large object (BLOB), but the structure of the data itself is not known upfront to the IoT platform and it may be changing over time. Thus, schema-based compression protocols like Avro, Protobuf, and Delta encoding also cannot be applied. Notably, Avro, Protobuf, etc. rely on fixed structures/dictionaries upfront and cannot be applied efficiently to non-structured data or messages with a previously unknown structure. While delta encoding/compression may be more efficient for IoT data compression when compared to the other methods above, its handling of float values and strings is also inefficient and still needs predefined schema. In addition, with Delta Compression, packet loss creates problems (e.g., sync, retransmissions, etc.), which is a relatively common occurrence in the IoT.

In some cases, it may be possible to use ZIP or another archive method by sending smaller IoT data in batches. However, doing so will add delays to the delivery of the data, making near-real time processing impossible. IoT data is also typically time sensitive (e.g., a sensor reading may become stale over time, etc.). So, while batching could alleviate some of the compression issues with small sets of data, doing so would also introduce large latencies in the end-to-end communications.

Another potential compression technique that may be suitable for IoT deployments is ZStandard, which is a real-time compression algorithm and supports building dictionaries for small data. However, again, these dictionaries needs to be pre-trained and re-shared between sender and receiver after each data change, which introduces a large overhead on the IoT data flow.

In-Flight Building and Maintaining Dictionaries for Efficient Compression for IoT Data The techniques herein introduce an approach to data compression and decompression that is suitable for IoT deployments whereby both the sender and receiver devices dynamically build dictionaries and adjust them as needed without actually exchanging dictionaries. Instead, every dictionary version may have an ID and/or a checksum, which can be included in ever message. In some aspects, at any given time, the sender may use a dictionary version that has been "approved" by the receiver device, to compress the data to be sent to the receiver device. In addition, both the sender and receiver devices may continue to compute the "next" dictionary. Then, when the sender device concludes that it's time to use the "next" dictionary, it may append the ID and/or checksum of the next dictionary to a message that is still encoded by the "approved" dictionary. In turn, the receiver device may respond with the checksum that it computed independently on its own "next" dictionary. If checksum matches, the sender device can start using the next dictionary. Otherwise, the sender device may continue to use its last "approved" dictionary and start rebuilding a new dictionary.

Specifically, according to one or more embodiments of the disclosure as described in detail below, a sender device in a network sends a plurality of uncompressed messages to a receiver device in the network. The sender device generates a sender-side compression dictionary based on the plurality of uncompressed messages. The receiver device also generates a receiver-side compression dictionary based on the uncompressed message. The sender device obtains an approval of the sender-side compression dictionary from the receiver device by sending a checksum of the sender-side compression dictionary to the receiver device, whereby the receiver device generates the approval by comparing the checksum of the sender-side compression dictionary to a checksum of the receiver-side compression dictionary. The sender device sends a compressed message to the receiver device that is compressed using the sender-side compression dictionary, after obtaining the approval of the sender-side compression dictionary from the receiver device.

Illustratively, the techniques described herein may be performed by hardware, software, and/or firmware, such as in accordance with the compression/decompression process 248, which may include computer executable instructions executed by the processor 220 (or independent processor of interfaces 210) to perform functions relating to the techniques described herein.

Operationally, the techniques herein introduce a data compression and decompression strategy that can be used in-flight and without the need to also communicate dictionaries between the sender and receiver devices. The techniques herein are particularly well suited for IoT communications, which typically use messages of relatively small data sizes and are of unknown schemas.

According to various embodiments, the techniques introduced herein operate in three phases:
1. Training phase: In order to compress the messages, an approved dictionary is required. Since the schema of the messages is unknown and the size of the data is small, a training phase is needed in which information is learned about the data to generate a dictionary. So, for some span of time, the sender device may send messages as-is to the receiver device, without any compression. The dictionary ID for these messages is typically either empty or null. In various embodiments, during this phase, both the sender device and receiver device generates its own dictionary from the uncompressed data.
2. Approval phase: When the sender device completes generating its dictionary, the dictionary still has to be approved by the receiver device, to make sure the compression and decompression happens using the same dictionary. Accordingly, the sender device may send a dictionary-info message to the receiver device, to seek approval of the new dictionary. In turn, the receiver device may compare the dictionary-info regarding the dictionary of the sender device to information regarding its own constructed dictionary, to either approve or reject the new dictionary of the sender device.
3. Compression and Decompression phase: If the receiver device approves the new dictionary of the sender device, the sender device then starts sending compressed messages to the receiver device based on the approved dictionary. In turn, the receiver device can use its own, newly constructed dictionary to decompress the messages and forward the messages on to their destination(s).

Figure 4A:
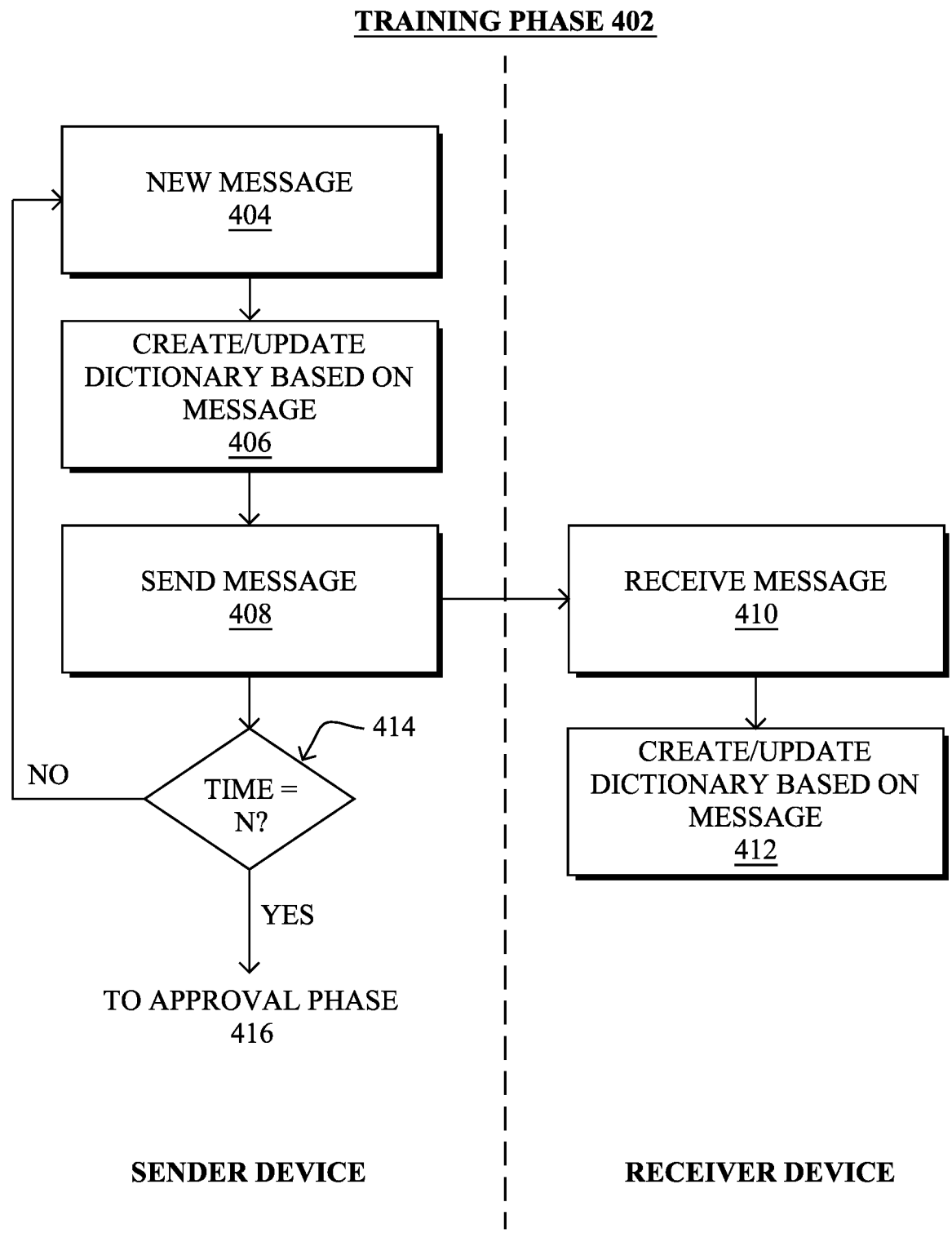
FIGS. 4A-4C illustrate the various phases of the data compression and decompression mechanisms introduced herein.
Figure 4B:
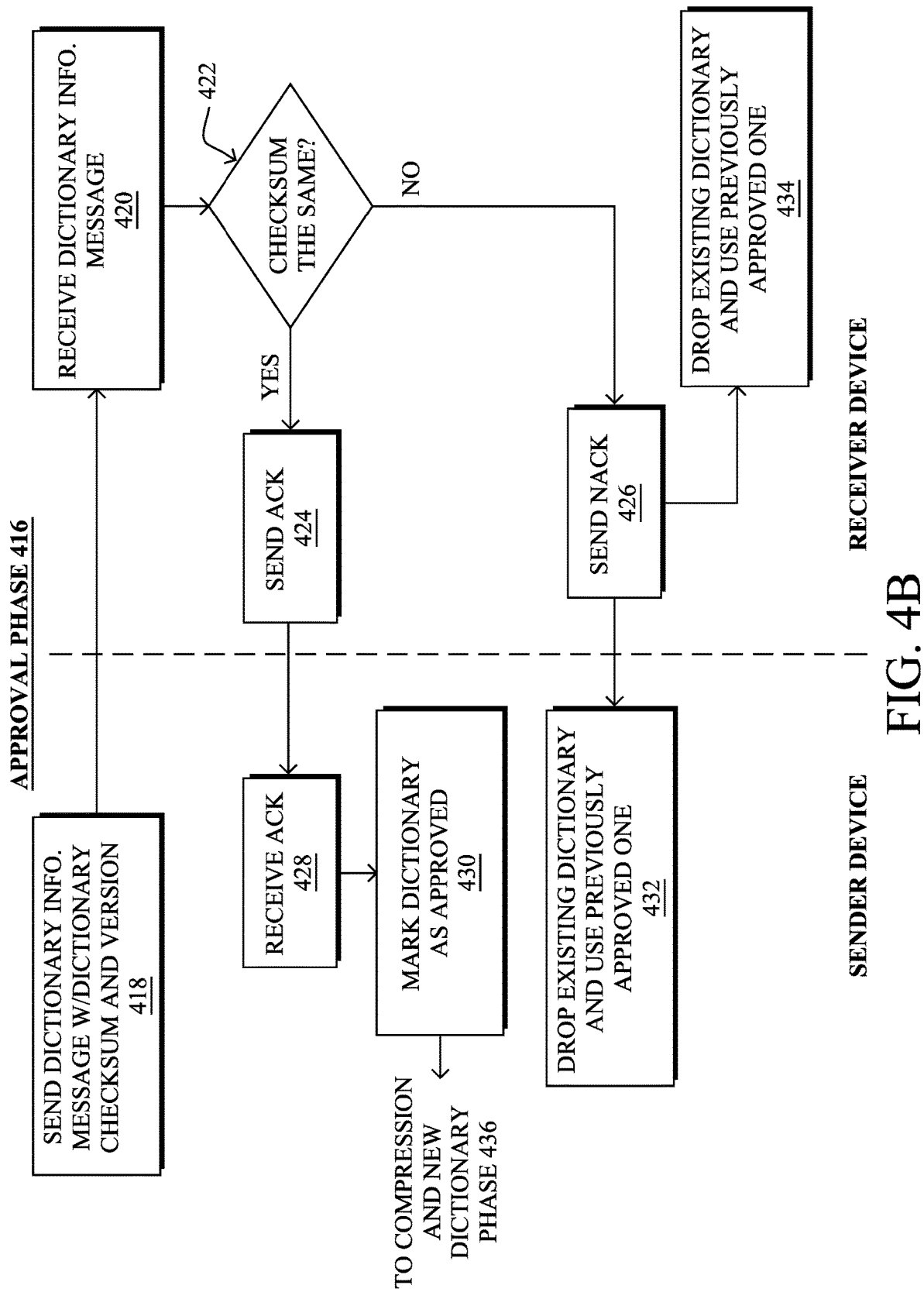
Figure 4C:
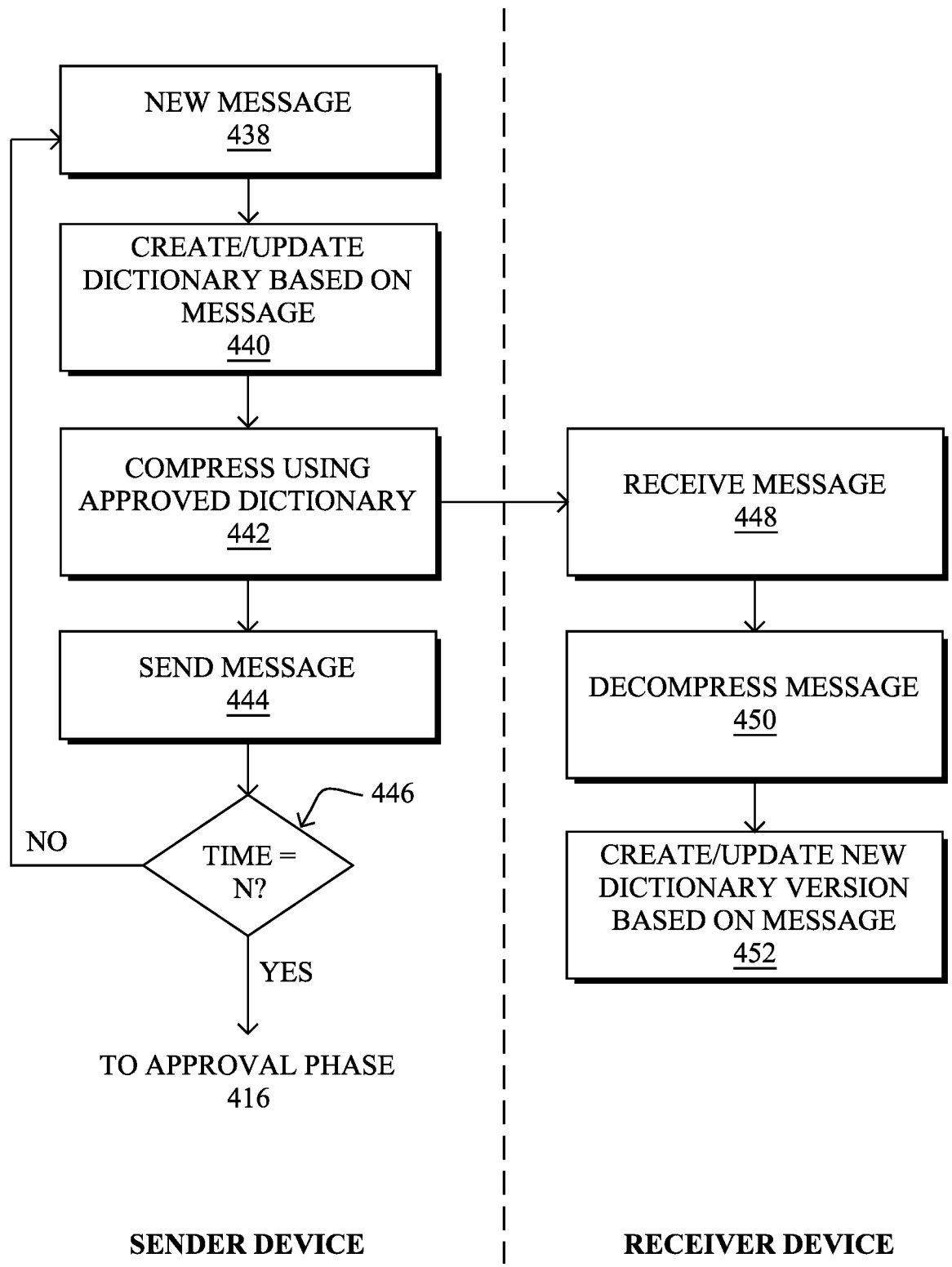

FIGS. 4A-4C illustrate the various phases of the data compression and decompression mechanisms introduced herein, according to various embodiments. FIG. 4A illustrates training phase 402 in which both a sender device and receiver device learn dictionaries from an initial set of uncompressed messages sent from the sender device to the receiver device.

As shown, assume that the sender device receives a new message from an IoT node (step 404). In such a case, the sender device may create or update a sender-side dictionary, based on the message (step 406). As would be appreciated, doing so may entail cataloging redundant information found within the message and/or prior messages from the source of the message. In turn, the sender device may send the message to the receiver device, as-is, and in an uncompressed format (step 408). Similarly, the receiver device receives the message (step 410) and creates or updates its own receiver-side dictionary, based on the uncompressed message (step 412).

The sender device may determine that training phase 402 is to end, based on any number of factors. In some embodiments, such as shown in FIG. 4A, the sender device may determine whether an amount of time has expired (step 414). If not, the sender device may wait for the next message from the source node and repeat the processing of training phase 402. Otherwise, the sender device may advance processing to the approval phase illustrated in FIG. 4B. In further embodiments, sender device may determine that training phase 402 has concluded, based on the number of messages or amount of data used by the sender device to construct its compression dictionary.

FIG. 4B illustrates the process flow for the approval phase 416 of the techniques herein, in various embodiments. Once the sender device has finished constructing its sender-side dictionary, it may send a dictionary information message to the receiver device (step 418), to request approval of the sender-side dictionary by the receiver device. In some embodiments, such a request may include a checksum of the sender-side dictionary undergoing approval and, potentially, a version or other identifier for the dictionary, as well.

The receiver device receives the dictionary information message from the sender device (step 420) and, in turn, determines whether the checksum of the sender-side dictionary matches a checksum of the receiver-side dictionary constructed by the receiver device (step 422). If the checksums match, the receiver device may return an acknowledgement (ACK) message to the sender device, to approve use of the new sender-side dictionary (step 424). In turn, the sender device may receive the approval ACK message (step 428) and mark the sender-side dictionary as approved (step 430).

If, for whatever reason, the receiver device determines that the checksums of the sender-side and receiver-side dictionaries do not match, the receiver device may instead send a "not acknowledged" (NACK) message back to the sender device (step 426). If the sender device receives such a NACK message, or if there is an error or timeout during the approval, the sender device may drop the dictionary undergoing approval and, if available, continue to use its most recently approved dictionary to perform the compression (step 432). Similarly, the receiver device, on rejecting the latest dictionary from the sender device, may also drop its latest receiver-side dictionary and continue to use its dictionary that corresponds to the last approved sender-side dictionary of the sender device (e.g., the last receiver-side dictionary whose checksum matched the checksum included in a dictionary info. message from the sender device).

FIG. 4C illustrates the process flow for the compression and next dictionary phase 436 of the techniques herein, according to various embodiments. As shown, assume that the sender-side dictionary of the sender device has been approved by the receiver device. In such a case, when the sender device receives a new message for sending (step 438), it may then create or update a new dictionary based on the data of the message (step 440). In addition, the sender device may use its most recently approved sender-side dictionary to compress the message (step 442) and send the compressed form of the message on to the receiver device (step 444).

In some embodiments, the sender device may also include the dictionary ID of the sender-side dictionary that it used to compress the message. In doing so, this allows both the sender device and the receiver device to version track the different dictionaries. In response to receiving the compressed message (step 448), the receiver device may then decompress the message using its own local receiver-side dictionary that corresponds with the latest approved sender-side dictionary (step 450). If the dictionary ID is included as metadata in the message, the receiver device may use this ID to select its own dictionary version for the decompression. Once decompressed, the receiver device may also create a new receiver-side dictionary, or update its newly created one, based on the data included in the decompressed message.

Similar to training phase 402, processing in compression and next dictionary phase 436 may continue until a stopping condition is met. For example, as shown, the sender device may determine whether a threshold amount of time has elapsed. If not, the sender device may continue to process new messages as shown, update its latest dictionary, and compress the messages using its most recently approved dictionary. Once the time limit has expired, processing may return to approval phase 436, to seek approval of the newest sender-side dictionary. In further embodiments, other stopping criteria to seek approval of a new dictionary can include the compression ratio of the currently approved dictionary, the amount or frequency of the data for sending, combinations thereof, or the like. For example, if the compression ratio reduces, this may signify that the source of the data is now sending data of a different kind, thus requiring the sender and receiver devices to first learn about the new data, to rebuild/update their dictionaries.

The above approach reduces the amount of data sent by the sender device to the receiver device, and without requiring the sender device to transmit the dictionary to the receiver device. In doing so, the size of the dictionaries does not matter, since they are generated independently and are never sent across the uplink.

A prototype was constructed using the techniques herein and a dictionary generated from a training sample dataset (T). In turn, the dictionary was used to compress messages for another sample set of messages (sets S1-S3 below). Test results for the prototype are shown below in Table 1:

TABLE 1

| Set | No. of Messages | Actual Size (bytes) | Compressed Size (bytes) | Avg. Comp. % | Total Size (KB) | Compressed Size (KB) | Total Compression % |
| --- | --- | --- | --- | --- | --- | --- | --- |
| T | 253 | 885 | 125 | 14.1 | 218 | 30 | 13.76 |
| S1 | 7444 | 880 | 141 | 16.02 | 14237 | 1025 | 7.199 |
| S2 | 2011 | 882 | 134 | 15.19 | 1733 | 263 | 15.17 |
| S3 | 2653 | 880 | 133 | 15.11 | 2281 | 346 | 15.16 |

Figure 5:
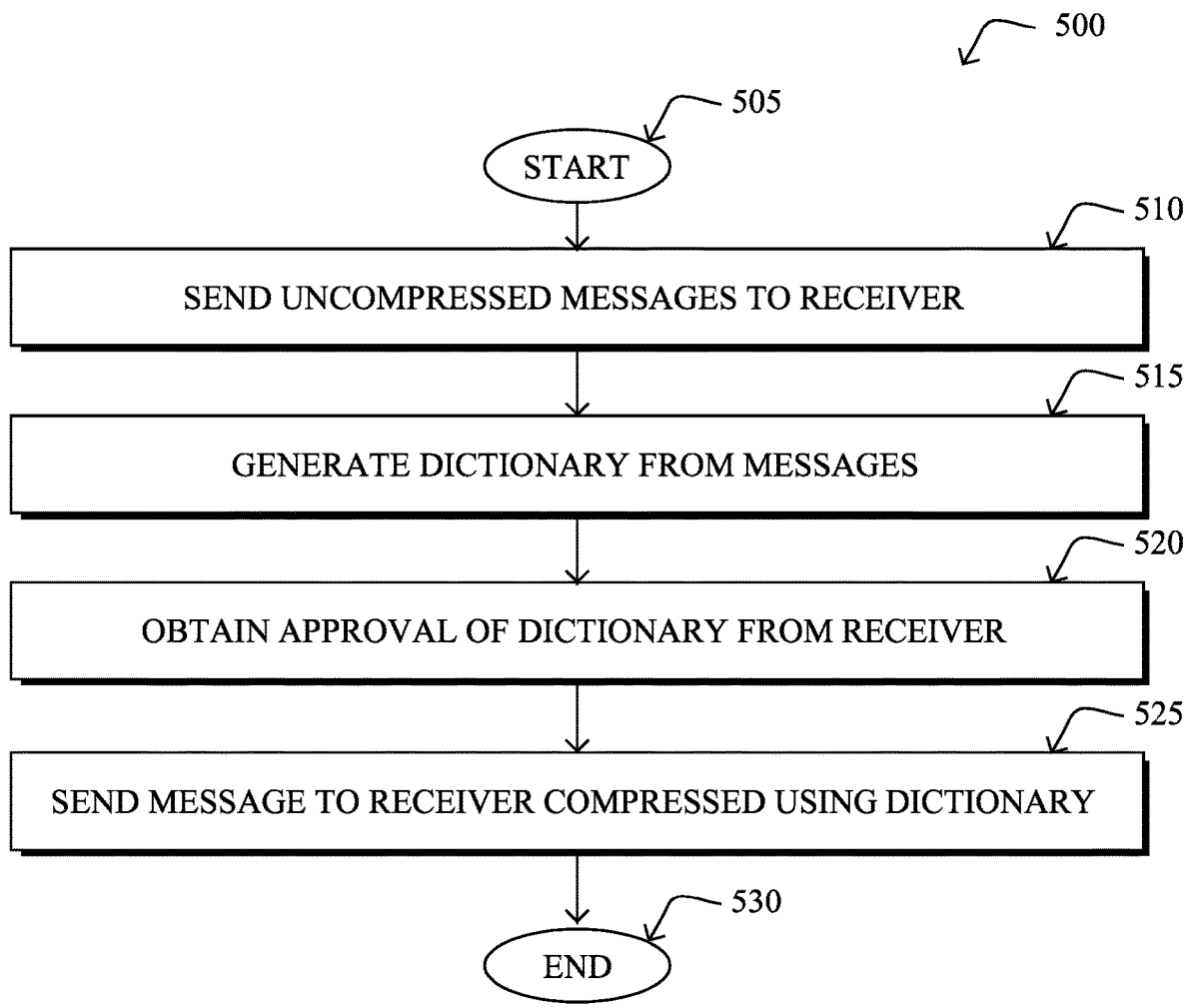
FIG. 5 illustrates an example simplified procedure for sending compressed data to a receiver device.

FIG. 5 illustrates an example simplified procedure for sending compressed data to a receiver device in a network, in accordance with one or more embodiments described herein. For example, a non-generic, specifically configured device (e.g., device 200) may perform procedure 500 by executing stored instructions (e.g., process 248), particularly as a sender device in the network. The procedure 500 may start at step 505, and continues to step 510, where, as described in greater detail above, the sender device may send a plurality of uncompressed messages to a receiver device in the network. For example, in some cases, the sender device may be a gateway that relays messages on behalf of an IoT node to a remote service or device.

At step 515, as detailed above, the sender device may generate a sender-side compression dictionary based on the plurality of uncompressed messages. In various embodiments, the receiver device also generates a receiver-side compression dictionary based on the uncompressed message.

At step 520, the sender device may obtain an approval of the sender-side compression dictionary from the receiver device, as described in greater detail above. In some embodiments, the sender device may do so by sending a checksum of the sender-side compression dictionary to the receiver device. In turn, the receiver device may generate the approval by comparing the checksum of the sender-side compression dictionary to a checksum of the receiver-side compression dictionary. If, however, the receiver device rejects the sender-side compression dictionary, the sender device may drop the dictionary and, if available, continue to use its most currently approved dictionary.

At step 525, as detailed above, the sender device may send a compressed message to the receiver device that is compressed using the sender-side compression dictionary, after obtaining the approval of the sender-side compression dictionary from the receiver device. In some cases, the sender device may also include an identifier for the approved sender-side dictionary as metadata in the message, to signal to the receiver device that the message was compressed using the approved dictionary. Procedure 500 then ends at step 530.

Figure 6:
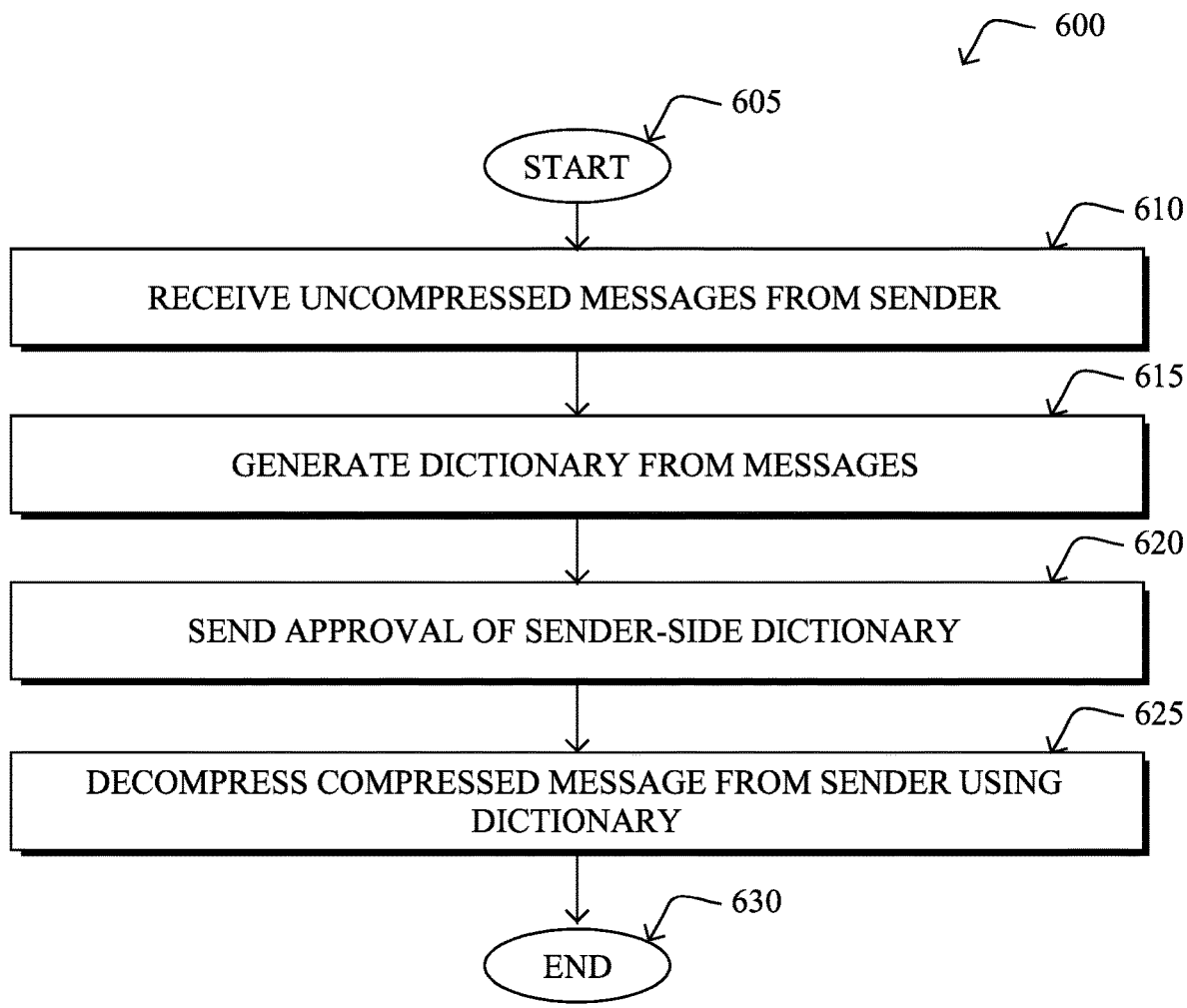
FIG. 6 illustrates an example simplified procedure for decompressing compressed data received from a sender device.

FIG. 6 illustrates an example simplified procedure for decompressing compressed data received from a sender device, in accordance with one or more embodiments described herein. For example, a non-generic, specifically configured device (e.g., device 200) may perform procedure 600 by executing stored instructions (e.g., process 248), particularly as a receiver device in the network. The procedure 600 may start at step 605, and continues to step 610, where, as described in greater detail above, the receiver device may receive a plurality of uncompressed messages sent by a sender device in the network. As part of the sending, the sender device may also generate a sender-side compression dictionary based on the uncompressed message.

At step 615, as detailed above, the receiver device may also generate a receiver-side compression dictionary based on the plurality of uncompressed messages. In general, the receiver device and sender device may use the same dictionary construction approach, to form their respective dictionaries.

At step 620, the receiver device may send an approval of the sender-side compression dictionary to the sender device, as described in greater detail above. In some embodiments, the receiver may do so based on a comparison of a checksum of its receiver-side compression dictionary to a checksum of the sender-side compression dictionary received from the sender device.

At step 625, as detailed above, the receiver device may decompress a compressed message sent to the receiver device. Such a message may have been compressed by the sender device using the sender-side compression dictionary, after the receiver device sends the approval of the sender-side compression dictionary to the sender device. Procedure 600 then ends at step 630.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide for the following advantages:
- Efficient data compression—compared to file compression.
- Dictionaries are NOT exchanged between sender and receiver devices.
- Compression working on-the-fly with low latency.
- Works well with any data-structure.
- Could be combined with, or used on top of, other compression methods.
- Even if some messages are lost, the dictionaries are not corrupted. This means the sender and receiver devices will still be able to compress/decompress without any issues.

While there have been shown and described illustrative embodiments that provide for in-flight building and maintaining dictionaries for IoT data compression and decompression, it is to be understood that various other adaptations and modifications may be made within the spirit and scope of the embodiments herein. For example, while certain embodiments are described herein with respect to using the techniques herein within an IoT deployment, the techniques are not limited as such and can be utilized in any form of communications network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    sending, by a sender device in a network, a plurality of uncompressed messages to a receiver device in the network;
    generating, by the sender device, a sender-side compression dictionary based on the plurality of uncompressed messages, wherein the receiver device generates a receiver-side compression dictionary based on the plurality of uncompressed messages;
    requesting, by the sender device, an approval of the sender-side compression dictionary from the receiver device by sending a checksum of the sender-side compression dictionary to the receiver device, wherein the receiver device generates the approval or a rejection of the sender-side compression dictionary by comparing the checksum of the sender-side compression dictionary to a checksum of the receiver-side compression dictionary;
    in response to receiving the approval of the sender-side compression dictionary from the receiver device, sending, by the sender device, a compressed message to the receiver device that is compressed using the sender-side compression dictionary;
    in response to receiving the rejection of the sender-side compression dictionary from the receiver device:
        dropping, by the sender device, the sender-side compression dictionary, and
        using, by the sender device, a sender-side compression dictionary most recently approved by the receiver device for compression;
    generating, by the sender device, an updated sender-side compression dictionary based on a compression ratio associated with the sender-side compression dictionary; and
    sending, by the sender device, a checksum of the updated sender-side compression dictionary to the receiver device, to obtain approval of the updated sender-side compression dictionary.

2. The method as in claim 1, wherein sending the compressed message to the receiver device further comprises:
    including a dictionary identifier for the sender-side compression dictionary as metadata for the compressed message.

3. The method as in claim 1, further comprising:
    receiving, at the sender device, a rejection of the updated sender-side compression dictionary from the receiver device, based on a checksum of an updated receiver-side compression dictionary not matching the sent checksum for the updated sender-side compression dictionary; and
    dropping, by the sender device, the updated sender-side compression dictionary, based on the received rejection.

4. The method as in claim 1, further comprising:
    receiving, at the sender device, an approval of the updated sender-side compression dictionary from the receiver device, based on a checksum of an updated receiver-side compression dictionary matching the sent checksum for the updated sender-side compression dictionary; and sending, by the sender device, a compressed message to the receiver device that is compressed using the updated sender-side compression dictionary, after receiving the approval of the updated sender-side compression dictionary from the receiver device.

5. The method as in claim 1, wherein the sender device generates the updated sender-side compression dictionary after expiration of a timer.

6. The method as in claim 1, wherein the sender device is a network gateway.

7. A method comprising:
receiving, at a receiver device in a network, a plurality of uncompressed messages sent by a sender device in the network, wherein the sender device generates a sender-side compression dictionary based on the plurality of uncompressed messages;
generating, by the receiver device, a receiver-side compression dictionary based on the plurality of uncompressed messages;
receiving, at the receiver device, a request for an approval of the sender-side compression dictionary from the sender device, the request including a checksum of the sender-side compression dictionary;
when a checksum of the receiver-side compression matches the checksum of the sender-side compression dictionary:
sending, by the receiver device, the approval of the sender-side compression dictionary to the sender device, and
decompressing, by the receiver device, a compressed message sent to the receiver device that is compressed using the sender-side compression dictionary, after sending the approval of the sender-side compression dictionary to the sender device;
when the checksum of the receiver-side compression does not match the checksum of the sender-side compression dictionary:
sending, by the receiver device, a rejection of the sender-side compression dictionary to the sender device, causing the sender device to drop the sender-side compression dictionary and use a sender-side compression dictionary most recently approved by the receiver device for compression, and
using, by the receiver device, a receiver-side compression dictionary corresponding to the sender-side compression dictionary most recently approved by the receiver device for compression; and
generating, by the receiver device, an updated receiver-side compression dictionary; and
receiving, at the receiver device, a checksum for an updated sender-side compression dictionary from the sender device, to obtain approval of the updated sender-side compression dictionary from the receiver device, wherein the sender device generates the updated sender-side compression dictionary based on a compression ratio associated with the sender-side compression dictionary.

8. The method as in claim 7, wherein the compressed message includes a dictionary identifier for the sender-side compression dictionary as metadata for the compressed message.

9. The method as in claim 7, further comprising:
sending, by the receiver device, a rejection of the updated sender-side compression dictionary to the sender device, based on a checksum of the updated receiver-side compression dictionary not matching the received checksum for the updated sender-side compression dictionary.

10. The method as in claim 7, further comprising:
sending, by the receiver device, an approval of the updated sender-side compression dictionary to the sender device, based on a checksum of the updated receiver-side compression dictionary matching the received checksum for the updated sender-side compression dictionary; and
receiving, at the receiver device, a compressed message from the sender device that is compressed using the updated sender-side compression dictionary, after sending the approval of the updated sender-side compression dictionary to the sender device.

11. The method as in claim 7, wherein the sender device generates the updated sender-side compression dictionary after expiration of a timer.

12. The method as in claim 7, wherein the sender device is a network gateway.

13. An apparatus, comprising:
one or more network interfaces to communicate with a network;
a processor coupled to the network interfaces and configured to execute one or more processes; and
a memory configured to store a process executable by the processor, the process when executed configured to:
send a plurality of uncompressed messages to a receiver device in the network;
generate a sender-side compression dictionary based on the plurality of uncompressed messages, wherein the receiver device generates a receiver-side compression dictionary based on the plurality of uncompressed messages;
request an approval of the sender-side compression dictionary from the receiver device by sending a checksum of the sender-side compression dictionary to the receiver device, wherein the receiver device generates the approval or a rejection of the sender-side compression dictionary by comparing the checksum of the sender-side compression dictionary to a checksum of the receiver-side compression dictionary;
in response to receiving the approval of the sender-side compression dictionary from the receiver device, send a compressed message to the receiver device that is compressed using the sender-side compression dictionary;
in response to receiving the rejection of the sender-side compression dictionary from the receiver device:
drop the sender-side compression dictionary, and
use a sender-side compression dictionary most recently approved by the receiver device for compression;
generate an updated sender-side compression dictionary based on a compression ratio associated with the sender-side compression dictionary; and
send a checksum of the updated sender-side compression dictionary to the receiver device, to obtain approval of the updated sender-side compression dictionary.

14. The apparatus as in claim 13, wherein the apparatus sends the compressed message to the receiver device by:
including a dictionary identifier for the sender-side compression dictionary as metadata for the compressed message.

15. The apparatus as in claim 13, wherein the process when executed is further configured to:
- receive a rejection of the updated sender-side compression dictionary from the receiver device, based on a checksum of an updated receiver-side compression dictionary not matching the sent checksum for the updated sender-side compression dictionary; and
- drop the updated sender-side compression dictionary, based on the received rejection.

\* \* \* \* \*